United States Patent
Le Gonidec et al.

(10) Patent No.: US 12,123,749 B2
(45) Date of Patent: Oct. 22, 2024

(54) METHOD FOR DETERMINING A FAULT FOR A SET OF SENSORS

(71) Applicant: ARIANEGROUP SAS, Les Mureaux (FR)

(72) Inventors: Serge Le Gonidec, Vernon (FR); Antoine Remy, Vernon (FR); Clément Treangle, Vernon (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/042,565

(22) PCT Filed: Aug. 16, 2021

(86) PCT No.: PCT/FR2021/051469
§ 371 (c)(1),
(2) Date: Feb. 22, 2023

(87) PCT Pub. No.: WO2022/043629
PCT Pub. Date: Mar. 3, 2022

(65) Prior Publication Data
US 2023/0349725 A1    Nov. 2, 2023

(30) Foreign Application Priority Data
Aug. 24, 2020   (FR) ...................................... 2008635

(51) Int. Cl.
*G01D 3/08*   (2006.01)
(52) U.S. Cl.
CPC ........................................ *G01D 3/08* (2013.01)
(58) Field of Classification Search
CPC ........................................................ G01D 3/08
See application file for complete search history.

(56) References Cited

U.S. PATENT DOCUMENTS

| | | | |
|---|---|---|---|
| 2015/0233730 A1* | 8/2015 | Guillet | G01C 23/00 701/3 |
| 2019/0019358 A1* | 1/2019 | McConkey | F01D 21/14 |
| 2022/0114843 A1* | 4/2022 | Kale | G06N 3/049 |

FOREIGN PATENT DOCUMENTS

FR    3013834 A1    5/2015

OTHER PUBLICATIONS

International Search Report and Written Opinion issued in International Application No. PCT/FR2021/051469, on Nov. 11, 2021 (18 pages).

* cited by examiner

*Primary Examiner* — Thien Nguyen
(74) *Attorney, Agent, or Firm* — Bookoff McAndrews, PLLC

(57) ABSTRACT

A method for determining a fault for a set of sensors, comprising:
obtaining data, said data comprising a plurality of measurements returned respectively by the sensors and a plurality of estimates determined respectively by a plurality of estimators taking as input different subsets of said measurements, at least one of the estimators comprising an artificial neural network;
calculating residuals representative of the deviation between data representing the same physical quantity;
determining that there is a fault on at least one of the sensors as a function of the residuals calculated based on data obtained from measurements returned by said sensor.

20 Claims, 1 Drawing Sheet

[Fig. 1]
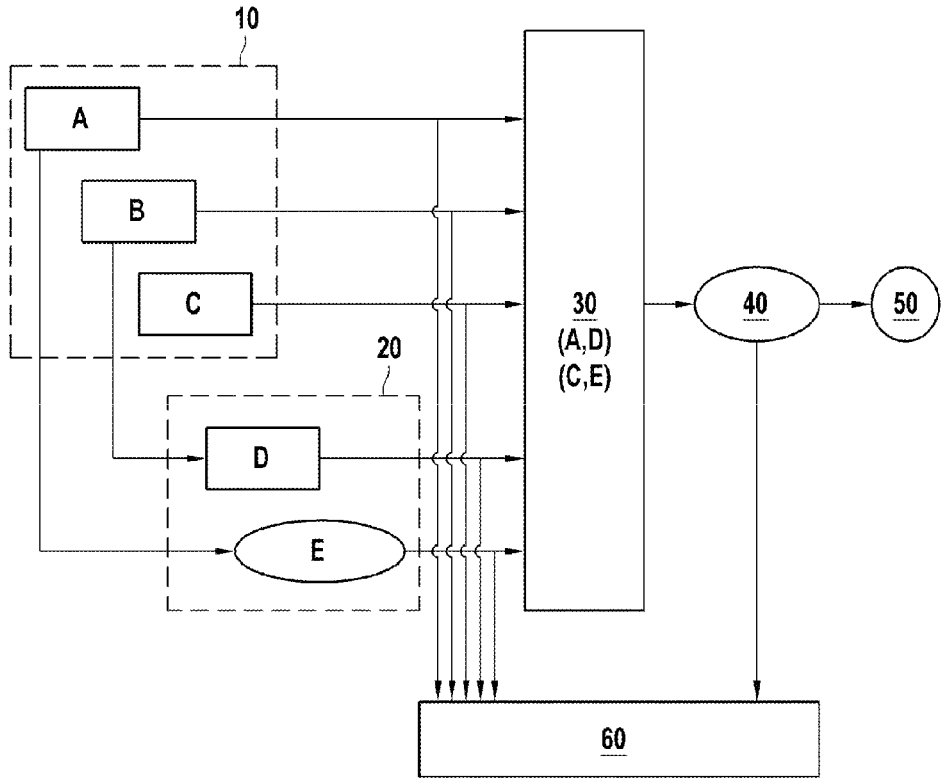
[Fig. 2]
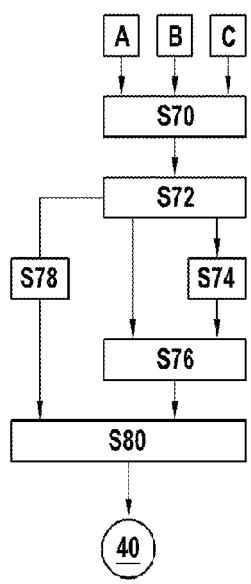

METHOD FOR DETERMINING A FAULT FOR A SET OF SENSORS

CROSS-REFERENCE TO RELATED APPLICATIONS

This patent application is a U.S. national stage entry of International Application No. PCT/FR2021/051469, filed on Aug. 16, 2021, now published as WO 2022/043629 A1, which claims priority to French Application No. 2008635, filed on Aug. 24, 2020.

TECHNICAL FIELD

The present disclosure relates to the field of validation of data acquired on a system by sensors, and more particularly to a method for determining a fault for a set of sensors. Such a method finds its application in many industrial fields, for example the real-time or deferred monitoring of aeronautical or space systems.

PRIOR ART

A physical system can be monitored by sensors in order to provide information on its operation, for example with the aim of improving its reliability or detecting malfunctions of the system. When the system in question is a critical system, such as the regulation of a rocket engine in flight, it is possible to provide a hardware redundancy of the sensors: several sensors acquire the same data or similar data, so that in the event of failure of one of them, it is always possible to monitor the system accurately and efficiently without compromising the operation.

A hardware redundancy is nevertheless detrimental in performing a given function, in particular with regard to the cost of the sensors and their maintenance. Conversely, reducing the hardware redundancy raises the question of the reliability associated with the validity of the remaining measurements: if a data is returned only by a single sensor, how to make sure that this data is reliable?

There is therefore a need for a new type of a fault determination method for a set of sensors.

DISCLOSURE OF THE INVENTION

To this end, the present disclosure relates to a method for determining a fault for a set of sensors, comprising:
- obtaining data, said data comprising a plurality of measurements returned respectively by the sensors and a plurality of estimates determined respectively by a plurality of estimators taking as input different subsets of said measurements, at least one of the estimators comprising an artificial neural network;
- calculating residuals representative of the deviation between data representing the same physical quantity;
- determining that there is a fault on at least one of the sensors as a function of the residuals calculated based on data obtained from measurements returned by said sensor.

A set of sensors comprises several sensors (at least two, or even at least three sensors) and the method aims to determine whether there is a fault on at least one of these sensors. The sensors return measurements taken on the monitored physical system (hereafter the system). The sensors are preferably mounted to monitor the same system.

At the same time, the system is also monitored by a plurality of estimators (at least two, or even at least three estimators). An estimator determines (provides as output) an estimate of a physical quantity of the considered system. An estimator takes as input an electronic signal (for example computer or logic signal), while a sensor takes as input a physical phenomenon directly. Each estimator can take as input one or several measurements returned by the sensors, directly or indirectly: for example, a first estimator can take as input three measurements; a second estimator can take as input a measurement and the estimate provided by the first estimator, which is itself based on three measurements: it is then considered that the second estimator takes as input, ultimately, a subset formed by said measurement and said three measurements (said measurement possibly being confused with one of said three measurements).

Within the meaning of the present disclosure and unless otherwise indicated, the mention of a "first" element, such as a first estimator, does not necessarily involve the existence of a "second" element nor, where applicable, any ordering relation between the first and the second element. The ordinal qualifiers are, in this context, used only for the sake of clarity and identification, without prejudging particular characteristics. Similarly, and vice versa, the mention of an element of higher (third, etc.) rank in no way implies that elements of lower rank, such as a possible second element, exist and/or have the characteristics that could have been presented elsewhere.

Some estimators can take as input the same subsets of measurements. For example, a third estimator taking as input the estimate provided by the second estimator can be provided. In the end, the basic information taken into account by the third estimator will therefore be the same as the information taken into account by the second estimator. Nevertheless, among the estimators considered, there is a plurality that takes as input different subsets of the measurements: each estimator of this plurality takes as input, directly or indirectly, a subset of measurements which differs from the subset of measurements taken as input by the other estimators. Two subsets differ if their intersection is not equal to their combination. The term "subset" is to be understood in the broad sense, in the sense that an estimator can take as input all the measurements, that is to say all the measurements returned by all the sensors.

In the following, for the sake of brevity, it will be considered that an estimator allows determining an estimate. However, this does not exclude the cases where an estimator provides several estimates, for example of different physical quantities but optionally linked to each other.

At least one of the estimators comprises an artificial neural network. An artificial neural network (ANN) is a calculation model including one or several neurons, each neuron having a transfer function. The ANN therefore has a global transfer function making it possible to calculate at least one output as a function of at least one input. The transfer functions of each neuron or the relative weights of the neurons in the network can be weighted by coefficients called synaptic weights (or simply weights) and biases. The weights can be modulated according to a training of the ANN. In principle, the training consists in providing the ANN with a set of situations in which the inputs and the outputs (or output targets) are known. During the training, the ANN adapts its synaptic weights and biases so that they conform to the learned situations, possibly with a certain tolerance. The ANNs are therefore an example of mathematical expressions whose coefficients are iteratively adapted according to the training. The weights and biases, once determined at the end of the training phase, then may or may not remain constant during the operation phase.

Typically, the training can be carried out at least prior to the implementation of the fault determination method, and possibly concomitantly.

The ANN is therefore capable of intelligently modeling a link between physical quantities by training from the actual behavior of said quantities in the system, without requiring the knowledge of the theoretical laws that govern it. As a result, the ANN is not necessarily constrained by the causal links that connect the different physical quantities to each other. Thus, for example, a flow rate is the physical consequence of a difference between an input pressure and an output pressure. In a quasi-static system, an ANN will be capable, unlike a conventional model built on the laws of physics (hereinafter "physics model" or "multiphysics model"), of determining, following a training, the upstream pressure as a function of the downstream pressure and of the flow rate. In other words, an ANN is capable of exchanging the inputs and the outputs with respect to classical physics or multiphysics models. This is then referred to as inverse relations.

The ANN moreover has a generalization capacity (also called "inference"), that is to say it is capable of determining the output values of a situation for which it is given the input data even if this situation has not been learned during the training phase, provided that the inputs are contained in a domain of validity (in other words, it is ensured that the values of the inputs of the situation to be calculated are comprised between or close to the extreme input values that were used for the training). This is particularly useful for systems having a wide range of operating points and for which it is industrially unthinkable to explicitly parameterize all the possible situations. For better accuracy, it should be checked that the training situations constitute a sufficiently refined mesh of the operating field. Furthermore, the ANN is an easily modular system. These advantages are also valid in the case of other types of mathematical expressions with iteratively evaluated coefficients.

Moreover, a trained ANN is generally faster to provide an estimate than a physics or multiphysics model, in particular when the model is non-linear. This is particularly advantageous for the real-time applications of the method, as the construction and/or the training of the ANN can be carried out beforehand. Finally, an ANN having no internal restriction dictated by physics, it adapts well to systems called "hybrid" systems, mixing continuous quantities and discrete quantities.

Thanks to the sensors and to the estimators, for at least one physical quantity of the system, there are at least two data obtained differently: either by several sensors, or by several estimators, or by a combination of at least one sensor and least one estimator. For at least some physical quantities, the data are obtained in whole or in part by estimators, which ensures a software redundancy and allows cost saving compared to a purely hardware redundancy.

For a given physical quantity, for which at least two data have been obtained, the method comprises the calculation of residuals representative of the deviation between data representing this physical quantity. For example, data representing this physical quantity are taken, and the deviations which separate these data taken two by two are calculated as residuals. The deviation can be a simple scalar difference or more generally a distance in an appropriate space.

The determination that there is a fault on at least one of the sensors can be carried out by means of a transfer function taking as input residuals, optionally all the residuals, and returning, as output, a fault indicator for at least one sensor having returned a measurement on which the residuals are based at least partly. The fault is therefore determined from residuals, themselves calculated from data, themselves being measurements or estimates determined from measurements, the measurements themselves being returned by sensors; a possible fault is then determined for one of these sensors. Conversely, with this method, a fault cannot be identified for sensors that have not provided any measurement resulting in the calculation of the residuals.

The transfer function can be for example a matrix, in particular determined analytically or numerically, one or several ANN, or the like.

The fact that the estimators take as input different subsets of said measurements allows the residuals to be representative of deviations between data from different measurements, so that the examination of the residuals allows going back to the erroneous measurement and therefore to the faulty sensor. Furthermore, the fact that at least one estimator comprises an ANN provides more robustness for the determination of the residuals. Thus, the present fault determination method allows using an at least partly software redundancy, with the associated cost and mass savings, while offering a robust evaluation of the validity of the data obtained.

In some embodiments, at least some of the residuals are representative of the deviation between a measurement and an estimate, or between two estimates. This ensures a software redundancy.

In some embodiments, the calculation of residuals is performed between all the pairs of data representing the same physical quantity. For example, all the data representing the same physical quantity are taken and these data are paired two by two to form all the possible pairs. Thus, with three data representing the same quantity, there will be three pairs (1, 2), (2, 3) and (1, 3). Then, the calculation of residuals can be performed for each pair, for example by difference between the two data of the pair.

In some embodiments, the set of sensors comprises at most one sensor per physical quantity. This avoids the hardware redundancy and further increases the cost and mass savings.

In some embodiments, the plurality of estimators comprises at least one estimator to provide an estimate of a physical quantity measured by one of the sensors. There is therefore a software redundancy between said sensor and said estimator. Preferably, said estimator does not take as input the measurement returned by said sensor. More generally, said estimator can take as input measurements other than the measurement returned by said sensor. The fault detection is made more accurate by the operation of the links between different measurements within the same monitored physical system.

In some embodiments, the artificial neural network is configured to determine an estimate of a first physical quantity occurring upstream of at least one second physical quantity whose measurement is taken as input by the artificial neural network.

As explained above, there may be a physical cause and effect relation between the first quantity (cause) and the second quantity (effect), whereby the first quantity is said to be upstream of the second quantity: the second physical quantity is normally a consequence of the first physical quantity. The ANN is based on an inverse relation allowing it to take as input the effect (the second quantity) and to determine as output an estimate of the cause (first quantity). Such a determination, which is impossible with a multiphysics model, increases the flexibility for the determination of the residuals and therefore, in the end, the reliability of the fault detection.

In some embodiments, in the determination that a fault exists, the residuals are given as input to at least one artificial neural network configured to return, for at least one of the sensors, an indicator of the existence and optionally the severity of a fault on said sensor.

In these embodiments, the transfer function mentioned above comprises an ANN taking as input the residuals and returning as output at least one fault indicator. The ANN can return an indicator per sensor and/or an indicator per fault, or a single indicator for all the sensors and all the faults (for example a number where each digit refers to a given sensor), or any intermediate situation. Similarly, the existence and the severity of a fault can be reflected by the same indicator (for example: 0 for an absence of fault and a positive number for a presence of fault, increasing according to the severity) or by different indicators, or any intermediate situation.

The present disclosure also relates to a fault determination system for a set of sensors, comprising:
- a data obtaining unit, configured to obtain data comprising a plurality of measurements returned respectively by the sensors and a plurality of estimates determined respectively by a plurality of estimators taking as input different subsets of said measurements, at least one of the estimators comprising an artificial neural network;
- a unit for calculating residuals representative of the deviation between data representing the same physical quantity;
- a unit of the determination configured to determine that there is a fault on at least one of the sensors as a function of the residuals calculated based on data obtained from measurements returned by said sensor.

This fault determination system can be able to implement the fault detection method as described previously.

In some embodiments, the different steps of the fault determination method are determined by computer program instructions.

Consequently, the present disclosure is also directed to a program on an information medium, this program being capable of being implemented in a fault determination system or more generally in a computer, this program including instructions adapted to the implementation of the steps of a fault determination method as described above.

This program can use any programming language, and be in the form of source code, object code or intermediate code between source code and object code, such as in partially compiled form or in any other desirable form.

The present disclosure is also directed to an information medium readable by a computer or by a microprocessor, and including instructions of a program as mentioned above.

The information medium may be any entity or device capable of storing the program. For example, the medium can include a storage means such as a ROM, for example a CD ROM or a microelectronic circuit ROM, or even a magnetic recording means for example a floppy disk or a hard disk.

On the other hand, the information medium can be a transmissible medium such as an electrical or optical signal, which can be conveyed via an electrical or optical cable, by radio or by other means. The program according to the present disclosure can be particularly downloaded on an Internet-type network.

The present disclosure also relates to a method for estimating a physical quantity from a set of sensors, comprising the fault determination for said set of sensors according to any one of the previously described embodiments, and the production of an estimate of the physical quantity from the sensors measuring said physical quantity and the estimators determining an estimate of said physical quantity, while ignoring the defective sensors for which the existence of a fault has been determined, and the estimators taking as input measurements returned by said defective sensors. By ignoring the defective sensors and the estimators based, directly or indirectly, on these sensors, the estimate of the physical quantity can be done based on reliable data. The redundancy can be structured so that there is always remaining reliable data even in the event of failure of a certain number of sensors, this number can be sized according to the needs and to the criticality of the monitored system.

The present disclosure also relates to a method for training an artificial neural network for a fault determination system for a set of sensors, comprising:
- obtaining data representing a plurality of measurements returned respectively by the sensors;
- generating defects on the measurements and fault indicators on the sensors, corresponding to the defects;
- adding, to the data, a plurality of estimates determined respectively by a plurality of estimators taking as input different subsets of the measurements, after generation of the defects;
- calculating residuals representative of the deviation between data representing the same physical quantity;
- training the artificial neural network by taking as input the residuals and as output target the fault indicators.

After training, the artificial neural network can be used to determine that there is a fault on at least one of the sensors in a method or the fault determination system according to any one of the embodiments previously described.

The principle of the training method is to generate a training base comprising data on which known errors—the defects—have been introduced and to perform the training of the ANN by taking as input the residuals calculated from these data and as output target the fault indicators established to correspond to the known errors introduced. From the same data representing a plurality of measurements, it is possible to create a training base comprising different copies of the data, by generating defects differing, between the copies, by their intensity, by the sensor(s) to which they relate, etc. Thus, a fault can be characterized by at least one sensor and at least one amplitude. The sensors and amplitudes can be optionally selected one and/or the other randomly to easily generate a large training base.

The estimates are determined by the estimators after generation of the defects, so that they take into account the defects in a manner consistent with the measurements, like what would happen on a real physical system in the event of failure of a sensor.

The stricto sensu training of the ANN, given an input (a first set of data) and an output target (a second set of data), is an operation known in itself to those skilled in the art, using for example a loss function whose object is to converge the estimate (third set of data), provided by the ANN based on the first set of data, towards the second set of data.

In some embodiments, the generation of a fault indicator comprises the comparison of the corresponding defect with a threshold associated with the sensor returning the measurement considered, and the emission of a fault severity level for said sensor based on said comparison. The corresponding defect is the defect introduced on the measurement considered and for which the fault indicator has been generated.

For example, the fault can be considered more severe if the fault exceeds a certain threshold, for example in terms of amplitude of the physical quantity measured. It is also possible to provide for several successive thresholds, the fault can be considered as all the more severe as the number of thresholds reached is large.

BRIEF DESCRIPTION OF THE DRAWINGS

Other characteristics and advantages of the object of the present disclosure will emerge from the following description of embodiments, given by way of non-limiting examples, with reference to the appended figures.

FIG. 1 schematically represents a fault detection system for a set of sensors, according to one embodiment.

FIG. 2 schematically represents a method for training an artificial neural network for a fault determination system for a set of sensors, according to one embodiment.

DETAILED DESCRIPTION

A fault determination method for a set of sensors will be described with reference to FIG. 1. In this example, a set of sensors 10 comprises three sensors A, B, C. However, any number of sensors, preferably greater than or equal to two, could be provided in the set of sensors 10. The set of sensors 10 is intended to be mounted on a physical system to be monitored, not illustrated, for example a rocket engine. The physical quantities to be monitored in the system and the types of sensors suitable for doing so can be chosen by those skilled in the art who know the system considered, according to their monitoring needs. In the case of a rocket engine, the quantities considered can be chosen among a pressure, a flow rate, a temperature, in particular of fluid or of a solid component, a speed of rotation, a valve position, a vibration, etc.

In this case, a first sensor A is configured to measure a first physical quantity $Y1$. The first sensor A returns a measurement $XA$, which is equal to the sum of the first quantity $Y1$ and of a measurement bias $ZA$: $XA=Y1+ZA$.

A second sensor B is configured to measure a second physical quantity $Y2$. The second sensor B returns a measurement $XB$, which is equal to the sum of the second quantity $Y2$ and of a measurement bias $ZB$: $XB=Y2+ZB$.

A third sensor C is configured to measure a third physical quantity $Y3$. The third sensor C returns a measurement $XC$, which is equal to the sum of the third quantity $Y3$ and of a measurement bias $ZC$: $XC=Y3+ZC$.

In this example, the quantities $Y1$, $Y2$, $Y3$ are assumed to be different, but it is possible to provide for several sensors measuring the same quantity (possibly within a negligible offset).

The quantities $Y1$, $Y2$, $Y3$ being different, the set of sensors comprises, in this example, at most one sensor per physical quantity. Thus, this embodiment is devoid of hardware redundancy.

In this example, it is considered that the third quantity $Y3$ is a physical quantity occurring upstream of the first quantity $Y1$: thus, given the physical laws governing the system, the first quantity $Y1$ is a consequence of the third quantity $Y3$. For example, the third quantity $Y3$ can be a pressure in a propellant tank, and the first quantity $Y1$ can be a flow rate in a pipe starting from this propellant tank.

The measurements $XA$, $XB$, $XC$ can be spot measurements, possibly repeated over time, or extend over a certain period.

Furthermore, a plurality of estimators 20 can be provided, in addition to the set of sensors 10, to monitor the system. In this case, the plurality of estimators 20 comprises two estimators D, E. However, any number of estimators, preferably greater than or equal to two, could be provided in the plurality of estimators 20. The physical quantities to be estimated in the system and the appropriate estimators to do so can be chosen by those skilled in the art knowing the system considered, according to their monitoring needs.

In this case, a first estimator D is configured to determine an estimate $XD$ of the first physical quantity $Y1$, which is equal to the sum of the first quantity $Y1$ and of an estimation bias $ZD$: $XD=Y1+ZD$. In this embodiment, the first estimator D can be a linear or non-linear physical model, or any other appropriate estimator. To determine the estimate $XD$, the first estimator D takes as input a subset of the measurements returned by the sensors, in this case the measurement $XB$ returned by the second sensor B. However, the estimate $XD$ could be determined based on more than one measurement.

A second estimator E is configured to determine an estimate $XE$ of the third physical quantity $Y3$, which is equal to the sum of the third quantity $Y3$ and of an estimation bias $ZE$: $XE=Y3+ZE$. In this embodiment, the second estimator E comprises an ANN. For example, the ANN can comprise one or several layers, in particular of a structure called Feedforward Network (FF or FFNN) or Multi-Layer Perceptron (MLP). The ANN can be trained based on data from physical models and/or test data. To determine the estimate $XE$, the second estimator E takes as input a subset of the measurements returned by the sensors, in this case the measurement $XA$ returned by the first sensor A. Like the estimate $XD$, the estimate $XE$ could be determined based on more than one measurement. Conversely, the second estimator E and particularly its ANN could return more than one estimate, that is to say have several outputs.

Thus, the estimators D and E take as input different subsets of the measurements $XA$, $XB$, $XC$ returned by the sensors A, B, C.

Furthermore, the plurality of estimators 20 therefore comprises at least one estimator, here two estimators D and E, to provide an estimate of a physical quantity measured by one of the sensors, in this case of the first quantity $Y1$ measured by the first sensor A and of the third quantity $Y3$ measured by the third sensor C, respectively.

This example is purely illustrative, the types of estimators can be adapted according to the needs of those skilled in the art taking into account the present disclosure. For example, the estimators can all comprise ANNs, or only some of them, as long as at least one of the estimators comprises an ANN.

Note that the estimator E, taking as input the measurement $XA$ and determining the estimate $XE$, is such that the ANN it comprises is configured to determine the estimate $XE$ of a physical quantity $Y3$ occurring upstream of the physical quantity $Y1$ whose measurement $XA$ is taken as input by the ANN. Thus, the estimator E, and more particularly its ANN, is configured to determine an estimate according to an inverse relation.

This can be particularly useful for determining estimates of quantities for which an exact redundancy is not possible. For example, a speed of rotation (resultant of the forces) is the resultant of the presence of torques (made of pressure, temperature, flow rate) applied on the turbine and the pump (input forces). It is possible to derive the pressure at the inlet of the turbine, knowing the speed and the pressure at the outlet of the pump.

Data refers to the set formed by the measurements XA, XB, XC and the estimates XD, XE. In this embodiment, the data present a redundancy for the first quantity Y1, evaluated thanks to the measurement XA and the estimate XD, and for the third quantity Y3, evaluated thanks to the measurement XC and the estimate XE. On the other hand, the second quantity Y2 is not subject to any redundancy, being only measured by the second sensor B.

Based on these data, residuals are calculated (functional block 30). The residuals are representative of the deviation between data representing the same physical quantity. For example, the first quantity Y1 is represented by the data XA (measurement) and XD (estimate). A residual R1 relating to the first quantity Y1 can be calculated as the difference between XA and XD: R1(A,D)=XA−XD=(Y1+ZA)−(Y1+ZD)=ZA−ZD:

Thus, in this example, the residual is equal to the difference in the measurement or estimation biases. In normal operation, this difference should be very small, in particular compared to Y1. If the residual R1 exceeds a certain threshold, then there is a failure on the first sensor A and/or the first estimator D, the bias of which is too great.

Rather than a simple scalar difference, another type of deviation can be calculated as a residual, depending on the nature of the measurement XA and of the estimate XD. For example, in the case of time signals, the deviation can be represented by the integral of the absolute value or of the square of the difference between the two signals. Other suitable deviations, in particular a distance in an adequate space, can be developed by those skilled in the art.

The residual R1(A,D) is representative of the deviation between a measurement XA and an estimate XD. If other sensors F and/or other estimators G returned a measurement or an estimate of the quantity Y1, it would be possible to calculate other residuals, for example by taking the data two by two: R1(A,F), R1(A,G), R1(D,F), R1(D,G), R1(F,G). Thus, residuals representative of the deviation between two measurements (XA and XF), between a measurement and an estimate (XA and XD, XA and XG, XF and XD, XF and XG), or even between two estimates (XD and XG), would be obtained. Optionally, the calculation of residuals can therefore be performed between all the pairs of data representing the same physical quantity, in this case Y1.

If the fault detection only targets the sensor(s) directly or indirectly relating to the quantity Y1, it is not useful to calculate the residuals relating to other quantities. However, in the present case, a more global detection is carried out, so that the residual R3 relating to the third quantity Y3 is also calculated. Thus, analogously: R3(C,E)=ZC−ZE.

Based on the residuals thus calculated, a determination 40 is made that there is a fault on at least one of the sensors A, B, C as a function of the residuals R1(A,D), R3(C,E) calculated based on data obtained from measurements returned by said sensor. It is recalled that the first estimator D takes as input the measurement XB; thus, the residual R1(A,D) is calculated based on data obtained from the measurements XA and XB returned by the sensors A and B. Likewise, the second estimator E takes as input the measurement XA; thus, the residual R3(C,E) is calculated based on data obtained from the measurements XA and XC returned by the sensors A and C.

It is thus understood that if only the residual R1 exceeds a threshold, while the residual R3 does not exceed any, then it can be reasonably concluded that the second sensor B is defective. If only the residual R3 exceeds a threshold, while the residual R1 does not exceed any, then it can be reasonably concluded that the third sensor C is defective. If both residuals R1 and R3 exceed thresholds, then it can be reasonably concluded that the first sensor A, whose measurement XA enters into the calculation of the two residuals, is defective.

This simple case allows clearly illustrating how the fact that the estimators take as input different subsets of the measurements, in particular for the evaluation of the same physical quantity, allows determining, as a function of the residuals, that there is a fault on at least one of the sensors. Strictly speaking, it could be deduced from high residuals R1 and R3 that the sensors B and C, or even A, B and C are defective, although simultaneous faults are less likely than a single fault on the first sensor A. Nevertheless, the fact of multiplying the sensors and the estimators, with respect to the present embodiment, allows establishing more finely the link between a residual exceeding a threshold and the location of a fault on one of the sensors.

Thus, in the real case of a rocket engine whose flight conditions are monitored by about fifty sensors, measuring some quantities among those listed above, the present method allows reducing the number of hardware sensors to around thirty, the other sensors being replaced by one or several estimators without this degrading the fault detection, and therefore the overall reliability and accuracy of the system. This results in a significant mass and cost saving, without loss of performance.

In the foregoing, the criterion described to identify a fault on a sensor was the fact that a residual exceeded a threshold. However, other criteria are possible, for example a significant variation of the residual over time, etc. More generally, a determination transfer function 40 takes as input the residuals and determines that there is a fault on at least one of the sensors as a function of the residuals calculated based on data obtained from measurements returned by said sensor.

As indicated previously, the determination transfer function 40 can comprise at least one ANN taking as input the residuals and configured to return, for at least one of the sensors, an indicator of the existence and optionally of the severity of a fault on said sensor. In the event of a plurality of ANNs, each ANN can be configured to identify a fault on a particular sensor. An example of ANN training will be described below.

Alternatively, the determination transfer function 40 can be an analytically or numerically determined function, for example a matrix taking as input a vector of residuals and returning a vector of indicators.

The determination 40 can provide the fault indication in the form of one or several indicators, or of a vector of indicators 50. For example, with reference to the present embodiment, the indicator 50 may be a three-digit number, each digit corresponding to a sensor. For example, an indicator of 010 indicates a slight fault on the second sensor B and no fault on the other two sensors, while an indicator of 200 indicates a heavy fault on the first sensor A and no fault on the other two sensors. The indicators can be numerical, as in the present example, or take any other desired form (a signal, an alphabetic character, a shape, a color, etc.)

Optionally, the data XA to XE and the indicator 50 can be taken as inputs by a synthesizer 60 which performs the synthesis thereof in order to take into account the faults reflected by the indicator 50 to improve the estimate of the physical quantities Y1 to Y3.

In this embodiment, the synthesizer 60 is configured to produce an estimate of a physical quantity, for example Y1, from the first sensor A measuring said physical quantity and from the first estimator D determining an estimate of said physical quantity, by ignoring the defective sensors for which the existence of a fault has been determined, and the estimators taking as input measurements returned by said defective sensors. Thus, if the indicator 50 indicates that a fault has been detected on the first sensor A, then the synthesizer 60 will be able to ignore the measurement XA and return the estimate XD as the estimate of the quantity Y1.

If the indicator 50 indicates that a fault has been detected on the second sensor B, then it is likely that the estimate XD, determined by the first estimator D from the measurement XB, is bad; then, the synthesizer 60 will be able to ignore the estimate XD and return the measurement XA as an estimate of the quantity Y1.

Finally, if the indicator 50 indicates that no fault has been detected, or that a fault has been detected on the third sensor C whose measurement XC does not affect the estimate of the first quantity Y1, then the synthesizer 60 will be able to take into account both the measurement XA and the estimate XD to provide an estimate of the first quantity Y1. For example, the synthesizer 60 can average XA and XD. Other combinations are possible, depending on the choice of those skilled in the art. Furthermore, the data can be weighted in the production of the estimate, for example according to the degree of fault and/or to the level of accuracy associated with each sensor/estimator.

A method for training an artificial neural network for a fault determination system for a set of sensors is now described, according to an embodiment, with reference to FIG. 2. Such an ANN can be used for the determination 40 presented previously.

The training method comprises a step S70 of obtaining data representing a plurality of measurements returned respectively by the sensors. The sensors can be the sensors A, B, C described previously. It is preferable that the sensors are the same as those on which the ANN will be required to determine faults, in order to take into account their own defects.

The data can directly comprise measurements XA, XB, XC returned by the sensors A, B, C, for example during system tests or recordings during previous missions, as illustrated in FIG. 2, and/or simulated data reproducing measurements returned by the sensors. Hereinafter, this will be referred in both cases to as measurements for the sake of brevity, whether these are acquired, simulated or obtained in another way.

These data are transmitted to step S72 of generating defects on the measurements. In this step, for example, the data obtained in step S70 are replicated and, on each copy, a known defect of given amplitude is generated on one or several given sensors. The choice of the amplitude of the defect and/or of the sensors concerned can be random, so as to quickly cover a large number of defects on a large number of sensors. The defects can be directed to a single sensor or a combination of sensors, in order to simulate simultaneous faults.

Thus, from the measurements XA, XB, XC, it is possible to generate for example two copies with defects: XA', XB, XC, with a slight defect on the first sensor A, and XA, XB", XC', with a severe defect on the second sensor B and a slight defect on the third sensor C.

The copies of the data, after generation of the faults, are transmitted to the estimators D, E which, for each copy of data, determine the estimates of the quantities based on the possibly distorted measurements. The estimates are then added to the representative measurement data from which they were determined, to form complete data. Thus, based on the preceding example and on the estimators D, E described previously, three sets of data are generated: (XA, XB, XC, XD, XE), (XA', XB, XC, XD, XE'), (XA, XB", XC', XD", XE). The first set of data represents a normal operation of the system, where all the sensors operate normally: it is therefore expected that the estimators determine correct estimates. In the second set of data, it is expected that a slight defect affects the estimate XE', due to the slight defect introduced on the measurement XA' taken as input by the second estimator E. If the second estimator E is not linear, the defect can of course be amplified or reduced. Similarly, but independently, in the third set of data, it is expected that a severe defect affects the estimate XD", due to the severe defect introduced on the measurement XB" taken as input by the first estimator D. The slight defect on the measurement XC' does not affect any estimator, in this example.

The data, comprising the measurements with defects generated in step S72 and the estimates with defects determined in step S74, then allow calculating residuals in step S76. The residuals are calculated as described previously, for each set of data. In the previous example, three sets of residuals (R1, R3), (R1', R3'), (R1", R3") can thus be obtained.

At the same time, in step S78, independently of the estimates and of the residuals, fault indicators are generated on the sensors, corresponding to the defects generated on the measurements in step S72. Indeed, the defects being known, it is possible to characterize the possible fault on each sensor with the format wished to be provided as output by the ANN.

For example, with three-digit numerical indicators as previously described, the first set of data would correspond to an indicator 000 (no fault on any sensor), the second set of data to an indicator 100 (slight defect on the first sensor A, none on the other sensors) and the third set of data to an indicator 021 (no defect on the first sensor A, severe defect on the second sensor B, slight defect on the third sensor C).

Particularly, the generation of a fault indicator for a sensor (for example, a digit of the aforementioned indicators) can comprise the comparison of the corresponding defect with a threshold associated with the sensor returning the considered measurement, and the emission of a fault severity level for said sensor based on said comparison. In the example above, the severity level is 1 if the defect is of an amplitude comprised between 2% and 5%, and is 2 if the fault is of an amplitude greater than 5%. If the defect is of an amplitude less than 2%, it is considered that there is no fault (the severity level is 0, which is also an indicator of absence of fault).

Of course, these thresholds are illustrative and can be modified, in number and in value, depending on the accuracy and reliability of the sensors considered, and this for each sensor, independently. Typically, instead of the two thresholds previously described, it is possible to provide for a single threshold (presence or absence of fault) or three thresholds or more.

Then, in step S80, the training of the ANN is carried out by taking as input the residuals, calculated in step S76, and as output target the fault indicators, generated in step S78. On this basis, the training can be carried out in a conventional manner in order to make the ANN capable, as illustrated in FIG. 1, of returning indicators 50 by having taken as input the residuals calculated in the functional block 30: for each set of data, iteratively, the ANN takes as input the residuals, estimates at least one indicator and corrects its internal weights according to the comparison between the estimated indicator and the indicator provided as output target.

Again, the example described above was based on a reduced number of sets of data to clarify the illustration, but the training of the ANN will be all the more fine as the sets of data allow finely meshing the operating field of the system and the defects likely to occur.

Although the present description refers to specific exemplary embodiments, modifications can be made to these examples without departing from the general scope of the invention as defined by the claims. Furthermore, individual characteristics of the different illustrated or mentioned embodiments can be combined in additional embodiments. Accordingly, the description and the drawings should be considered in an illustrative rather than restrictive sense.

The invention claimed is:

1. A fault determination method for determining a fault for a set of sensors, comprising:
    obtaining data, said data comprising a plurality of measurements returned respectively by the sensors and a plurality of estimates determined respectively by a plurality of estimators taking as input different subsets of said measurements, at least one of the estimators comprising an artificial neural network;
    calculating residuals representative of the deviation between data representing a same physical quantity;
    determining that there is a fault on at least one of the sensors as a function of the residuals calculated based on data obtained from measurements returned by said sensor.

2. The fault determination method according to claim 1, wherein at least some of the residuals are representative of the deviation between one of the plurality of measurements and one of the plurality of estimates, or between two of the plurality of estimates.

3. The fault determination method according to claim 1, wherein calculating the residuals is performed between every two pieces of data that represent a same physical quantity.

4. The fault determination method according to claim 1, wherein the set of sensors comprises at most one sensor per physical quantity.

5. The fault determination method according to claim 1, wherein the plurality of estimators comprises at least one estimator to provide an estimate of a physical quantity measured by one of the sensors.

6. The fault determination method according to claim 1, wherein the artificial neural network is configured to determine an estimate of a first physical quantity occurring upstream of at least one second physical quantity whose measurement is taken as input by the artificial neural network.

7. The fault determination method according to claim 1, wherein, in the determination that there is a fault, the residuals are given as input to at least one artificial neural network configured to return, for at least one of the sensors, an indicator of an existence and optionally of a severity of the fault on said sensor.

8. A method for estimating a physical quantity from a set of sensors, comprising the fault determination for said set of sensors according to claim 1, and producing an estimate of the physical quantity from the sensors measuring said physical quantity and the estimators determining an estimate of said physical quantity, while ignoring defective sensors for which an existence of a fault has been determined, and the estimators taking as input measurements returned by said defective sensors.

9. The fault determination method according to claim 2, wherein calculating the residuals is performed between every two pieces of data that represent a same physical quantity.

10. The fault determination method according to claim 2, wherein the set of sensors comprises at most one sensor per physical quantity.

11. The fault determination method according to claim 3, wherein the set of sensors comprises at most one sensor per physical quantity.

12. The fault determination method according to claim 2, wherein the plurality of estimators comprises at least one estimator to provide an estimate of a physical quantity measured by one of the sensors.

13. The fault determination method according to claim 3, wherein the plurality of estimators comprises at least one estimator to provide an estimate of a physical quantity measured by one of the sensors.

14. The fault determination method according to claim 4, wherein the plurality of estimators comprises at least one estimator to provide an estimate of a physical quantity measured by one of the sensors.

15. The fault determination method according to claim 2, wherein the artificial neural network is configured to determine an estimate of a first physical quantity occurring upstream of at least one second physical quantity whose measurement is taken as input by the artificial neural network.

16. The fault determination method according to claim 3, wherein the artificial neural network is configured to determine an estimate of a first physical quantity occurring upstream of at least one second physical quantity whose measurement is taken as input by the artificial neural network.

17. The fault determination method according to claim 4, wherein the artificial neural network is configured to determine an estimate of a first physical quantity occurring upstream of at least one second physical quantity whose measurement is taken as input by the artificial neural network.

18. The fault determination method according to claim 5, wherein the artificial neural network is configured to determine an estimate of a first physical quantity occurring upstream of at least one second physical quantity whose measurement is taken as input by the artificial neural network.

19. A method for training an artificial neural network for a fault determination system for a set of sensors, comprising:
    obtaining data representing a plurality of measurements returned respectively by the sensors;
    generating defects on the measurements and fault indicators on the sensors, corresponding to the defects;
    adding, to the data, a plurality of estimates determined respectively by a plurality of estimators taking as input different subsets of the measurements, after generation of the defects;
    calculating residuals representative of the deviation between data representing a same physical quantity; and
    training the artificial neural network taking as input the residuals and as output target the fault indicators.

20. The training method according to claim 19, wherein the generating a fault indicator comprises comparing the corresponding defect with a threshold associated with the sensor returning the measurement considered, and emitting a fault severity level for said sensor based on said comparison.

* * * * *